United States Patent [19]
Pendleton

[11] 3,804,245
[45] Apr. 16, 1974

[54] APPARATUS FOR CLASSIFICATION OF PARTICULATE MATERIALS

[75] Inventor: Frank P. Pendleton, Montclair, N.J.

[73] Assignee: Vac-U-Max, Belleville, N.J.

[22] Filed: July 11, 1972

[21] Appl. No.: 270,808

[52] U.S. Cl.............. 209/240, 209/250, 209/318, 55/274
[51] Int. Cl.............................................. B07b 7/00
[58] Field of Search .......... 209/240, 250, 354, 355, 209/317, 318, 312, 321, 242, 243; 55/274; 15/253

[56] References Cited
UNITED STATES PATENTS

| | | |
|---|---|---|
| 276,789 | 5/1883 | Randolph...................... 209/250 X |
| 1,530,193 | 3/1925 | Montgomery.................. 209/250 X |
| 2,696,908 | 12/1954 | Weston......................... 209/250 X |
| 2,713,977 | 7/1955 | Noll.............................. 209/250 X |
| 3,323,647 | 6/1967 | Ogden........................... 209/223 R |
| 3,383,839 | 5/1968 | Kintermaier..................... 55/274 X |
| 3,438,490 | 4/1969 | Peterson........................... 209/250 |
| 3,662,886 | 5/1972 | Kennedy........................... 209/250 |

Primary Examiner—Robert Halper

[57] ABSTRACT

An enclosed Hopper connected to a vacuum source is fitted with an inclined vibratory screen. A flexible conduit delivers material from a point of consumption to impinge on an abrasion resistant liner on the inner wall of the hopper above the screen. A transparent conduit with a vacuum valve delivers the screened material back to the point of consumption.

3 Claims, 2 Drawing Figures

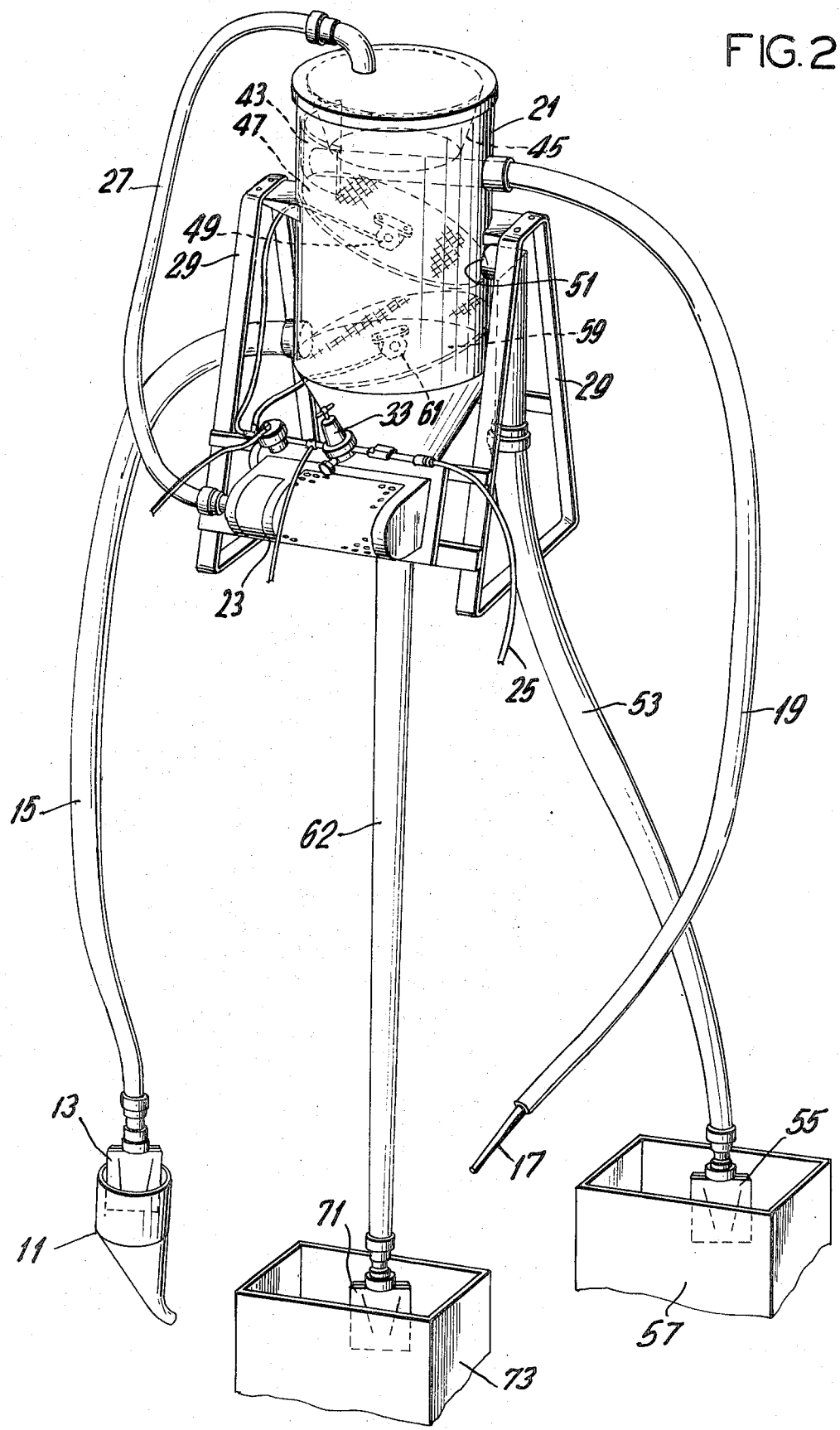

3,804,245

APPARATUS FOR CLASSIFICATION OF PARTICULATE MATERIALS

BACKGROUND OF INVENTION

The classification of particulate materials has become a highly developed art, yet need continues to exist for economic methods and apparatus to accomplish the necessary separation to meet the requirements of specific industries.

In particular, there is a need for consolidating equipment to perform the desired result in a minimum of space and equipment and yet achieve efficient and economic pneumatic conveying and separation of materials to be classified.

This is especially true in light industrial operations, such as submerged arc welding, wherein it is desired to recycle used welding flux and continuously remove sintered agglomerates or slag from the reusable flux material.

It has been the general practice in submerged arc welding operations to provide a removable basket screen within an overhead hopper to retain agglomerates or sintered particles which are discharged from the system by shutting down the system and manually removing the screen and sintered particles retained thereon. This is both inconvenient and time consuming, and does not lend itself to a fully automated operation.

In addition, it has been necessary to provide a manually operated butterfly on slide valve at the base of the flux-containing feed hopper to create a vacuum tight system which will facilitate charging of said hopper on start up of the system.

The compact classification of particulate materials is also a problem in other light industrial operations, such as the separation of agglomerated resinous materials from finer reusable particles.

In these and similar fields, large, expensive, classification equipment is totally impracticable and cannot be justified considering the overall economics of the basic operation involved.

Accordingly, it is an object of this invention to provide an apparatus for pneumatic conveying and classification of particulate materials in an economic manner and especially with a minimum investment in equipment.

More specifically, it is an object of the invention to provide an apparatus for pneumatic conveying and classification of welding flux.

Further objects will be apparent from the accompanying description of the invention, as hereinafter described.

BRIEF DESCRIPTION OF FIGURES

FIG. 2 is a schematic view, in elevation, showing another embodiment of the invention.

DESCRIPTION OF THE PREFERRED EMBODIMENT

Figure 1:
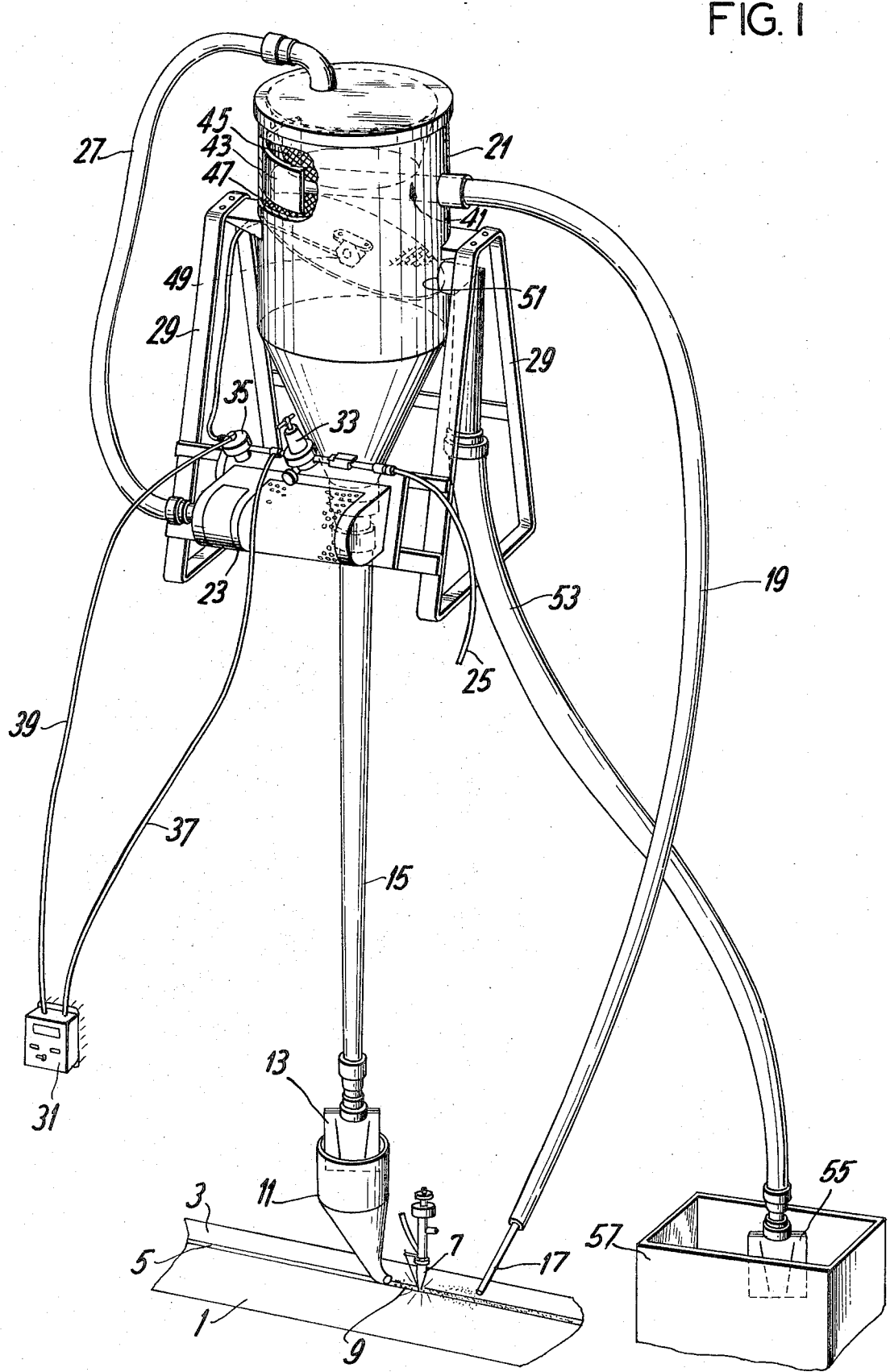
FIG. 1 is a schematic view, in elevation, showing a system for classifying welding flux in accordance with this invention.

While the present invention is broadly applicable to the pneumatic conveying and classification of particulate materials into two or more fractions of desired average particle size, it is especially useful in the classification of recycled welding flux in submerged arc welding operations. Submerged arc welding is a welding technique which employs granular, fusible, or similar minerals, such as silica, metal oxides and mixtures thereof to envelope a welding electrode and the seam of the work pieces to be welded and thereby exclude atmospheric oxygen from the seam to minimize deliterious oxidation of the welded seam. The submerged arc welding process is more specifically described at page 289 of "WELDING DATA BOOK: 1972-73." The technique is becoming of increased commercial importance since it does not generate the amount of atmospheric pollution that usually accompanies various gas-enveloped welding techniques.

Submerged welding, however, does involve problems in the handling of the welding flux due to the fact that the high temperatures to which the flux is subjected cause sintering of the flux particles, which necessitates classification of the used flux to remove slag or agglomerates when the flux is recycled for further use.

Referring to FIG. 1, elements 1 and 3 are workpieces being welded together by a weld seam 5 by means of a welding electrode 7, the details of which do not form a part of this invention and hence are not shown. The base of electrode 7 is submerged under a mound of welding flux 9 which substantially excludes the atmosphere from seam 5 and workpieces 1 and 3 immediately adjacent the weld. Welding flux 9 is fed to a point preceding electrode 7 by a flux spreader hopper 11 which delivers a measured amount of flux, generally sufficient to submerge the seam, say to a depth of about 1 inch and a width of about 1½ inches at the electrode to accomplish the desired result. The flux fed to electrode 7 is advantageously of a particle size which will pass through about a 12 to 20 mesh screen (U.S.) with openings of from 1,680 to 840 microns (0.0661 to 0.0331 in.) or from about 10 to 20 on the Tyler Scale. The flux 9 is delivered to hopper 11 by means of a vacuum valve 13 which in turn is fed by a column of flux contained in a flux discharge tube 15. Vacuum valve 13 is a neoprene or similar flapper type valve which normally opens when sufficient weight of flux material is built up within tube 15 while vacuum is still applied at the top of the column of flux within the tube. A preferable vacuum valve, manufactured by the VAC-U-MAX Company of Belleville, N.J. under the trademark "VAC-U-MAX," is well known in the art.

The used flux 9 is then withdrawn from the workpieces 1 and 3 by a vacuum pick-up nozzle 17 through a vacuum actuated pick-up tube 19. The flux spreader hopper 11, electrode 7 and pick-up nozzle 17 may all form part of an integral welding head structure, not shown, which may be longitudinally movable with respect to the workpieces, or the workpieces may be movable with respect to such welding head structure.

The recycled flux 9 is fed through tube 19 to a hopper 21 which is under vacuum of about 3 to 6 inches of Mercury for classification of the recycled material. The vacuum within hopper 21 is preferably generated by a venturi vacuum power unit 23 fed by a source of high pressure air 25, say about 60 to 90 p.s.i. gauge pressure, from a central source not shown. Other means of vacuum generation could, of course, be employed.

Vacuum generated by power unit 23 is applied to hopper 21 through tube 27 entering the top of the hopper 21. Advantageously, the hopper 21, power unit 23 and associated components are suspended overhead to facilitate maximum flexability of operation about the work pieces. A suitable frame 29 for so suspending the hopper and related mechanisms is shown in FIG. 1.

Because the power unit 23 may be remotely located from the workpieces, a remote control panel 31 may be provided if desired. In addition a manually actuated regulator valve 33, fed by the high pressure air source 25, may be included in the system to regulate the pressure of the air before it is introduced to the power unit 23. The primary control, however, is through a master control valve 35 which may be remotely actuated by control panel 31 through pneumatic pressure introduced through tube 37 to a pneumatic on-off switch in panel 31, which feeds high pressure air back to control valve 35 through tube 39 to actuate the same to the open or closed position and thereby introduce high pressure air to the venturi power unit 23.

The vacuum applied to hopper 21, as previously described, withdraws the used flux 9 through tube 19 into hopper 21. Where tube 19 enters hopper 21 it is preferably connected to a rubber or synthetic rubber hose 41, such as. neoprene, to minimize abrasion. Hose 41 extends radially across hopper 21 to within about 1 to 2 inches of its inner circumference and terminates so that it discharges against a liner 43 of resilient material, such as rubber or Neoprene which acts as a cushion to prevent abrasion of the hopper by the particles introduced through tube 19 and hose 41.

The fines or flour carried through with used flux 9 are prevented from being introduced into the vacuum system by a filter screen 45 disposed at the top of the hopper 21, above hose 41 and liner 43. Filter screen 45 which may be disposed over a rigid member, is preferably constructed of cotton twill or mole skin to eliminate the passage of fines to the vacuum source. If separation of fines and flour is desired at this point, it may be accomplished by elimination of filter 45 and the addition of a separate vacuum collector connected to the top of hopper 21 and to the source of vacuum power unit 23, with appropriate provision for the discharge of fines.

The separation of sintered flux or slag, which is generally of a size which will be retained on a 12 to 20 mesh screen (U.S.), is accomplished by a vibratory screen 47 actuated by a pneumatically driven vibrator 49 fed by high pressure air from the output side of control valve 35. Vibrator 49 may be of conventional design and affixed to the bottom of screen 47 as shown. Screen 47 is suspended within hopper 21 at an angle from the horizontal of from about 15 to 30°, preferably about 20°, to achieve maximum separation of sintered particles from reusable particles of flux.

For purposes of classifying used welding flux into reusable and waste fractions, screen 47 is preferably of about 12 to 20 mesh U.S. series.

At the lowermost periphery of screen 47 there is provided an exhaust port 51 which feeds into an exhaust hose or tube 53, the purpose of which is to remove the relatively coarse and unusable sintered particles of flux 9. The sintered particles are removed through a vacuum valve 55 and a receptacle 57 which collects the waste flux. The remaining and reusable particles of recycled flux 9 pass through screen 47 and down through flux discharge tube 15 to flux spreader hopper 11 for reapplication to the workpieces.

Flux discharge tube 15 and sintered particle discharge tube 53 normally will discharge when the weight of the column in each tube exceeds the vacuum pressure exerted upon each column through hopper 21. However, to facilitate control of the material flow in each instance, tubes 15 and 53 are constructed of a clear plastic material such as a reinforced vinyl, flexible plastic hose sold under the trademark "VIN-Y-LOY" by VAC-U-MAX of Belleville, N.J. By using such material the height of the column within the hoses or tubes can be clearly discerned, and suitable adjustments in the rate of feed and discharge may be made without the need of separate sight glasses or separate flow control mechanisms. Thus, when tube 53 is filled, the entire unit may be deactivated, thereby permitting the sintered flux to discharge through vacuum valve 55 into receptacle 57. By the same token, if the material in flux discharge tube 15 becomes too low for normal operational levels, the unit may be recharged by disconnecting pick-up nozzle 17 and using it to feed additional new flux to the system from a reservoir of fresh flux.

By using a neoprene valve of the type disclosed at the discharge end of both the flux feed and slag removal hoses, the respective valves draw closed when subjected to vacuum, until the pressure of material in the respective columns overcomes the vacuum. This obviates manual feed of material and manual removal of waste products.

FURTHER EMBODIMENTS

A further embodiment of the invention involves the separation of fines of flour in one unit, which is achieved by a modification of the aforesaid preferred embodiment. This is achieved in accordance with FIG. 2 if a more refined separation of coarse, sintered or agglomerated particles from the fines or flour fractions is desired. Referring to FIG. 2, the recycled material is picked up by vacuum through nozzle 17 and tube 19 as before indicated. Screen 45 may be retained if desired to insure against fines entering the source of the vacuum applied to the system. The material collected through tube 19, from whatever source, impinges against liner 43 and is deflected to screen 47 for separation of the coarse particles or agglomerates as previously described. The coarse particles are removed through tube 53 and discharged from the system as above indicated. Beneath screen 47 is a further screen 59 of finer size, say about 20 mesh (U.S. Series) which is designed to screen out and retain reusable particles which pass through screen 47. Screen 59 is disposed within hopper 21 at an angle of about 15° to 30° from the horizontal, and preferably about 20°, to achieve maximum separation of the desired particles without backing up of material at the point of discharge. It is also preferably assisted in its operation by a pneumatically operated vibrator 61, as applied to screen 59. In this case the reusable material is discharged from the base of screen 59 through tube 15, vacuum valve 13 and hopper 11. The flour or unwanted fines will drop through both screens 51 and 59 into central tube 62 and be discharged through vacuum valve 71 into box 73 for disposal.

It will be understood that this invention is not limited to the classification of flux, but rather, that it is applicable to the classification of any particulate material by similar means as herein described. Indeed, resort may be had to such modifications and equivalents as fall within the spirit of the invention and the scope of the appended claims.

I claim:

1. Apparatus for continuously recycling and classifying particulate materials comprising an enclosed hopper connected with a source of vacuum near the top thereof, a filter screen separating the source of vacuum from the rest of said hopper, a conduit for transporting to said hopper from a point of consumption particulate material to be classified, an abrasion resistant, resilient conduit connected to the aforesaid conduit for introducing said material within the top of said hopper below said vacuum connection and filter screen, and extending radially across said hopper, and abrasion resistant resilient liner on the inner side wall of said hopper and disposed adjacent and spaced from the discharge end of said resilient conduit, a pneumatically activated vibratory screen below said point of introduction disposed within said hopper at an angle of about 15° to 30° from the horizontal, a conduit connected above said screen for controlled continuous discharge from its lowermost point of coarse particles retained thereon and a conduit connected to said hopper below said screen for discharging by gravity feed material that passes through said screen and a vacuum valve for controlled delivery of the same by gravity feed while the system is under vacuum to said point of consumption of said particulate material.

2. Apparatus according to claim 1, wherein the conduit for discharging coarse material from the lowermost point of said screen and the conduit for discharging material to said point of consumption comprise, respectively, a substantially clear, flexible, reinforced plastic tube, whereby the level of material discharged may readily be ascertained to facilitate control of the flow of material in the system.

3. An apparatus according to claim 1, including a second pneumatically activated vibratory screen below said first said screen disposed within said hopper at an angle of about 15° to 30° from the horizontal, a conduit above said screen for controlled discharge from its lowermost point of usable particles in an intermediate range and means for controlled discharge from the base of said hopper of fine particles.

* * * * *